June 24, 1930. T. U. WHITE 1,765,474
CONTROL SYSTEM
Filed June 24, 1924 8 Sheets-Sheet 3
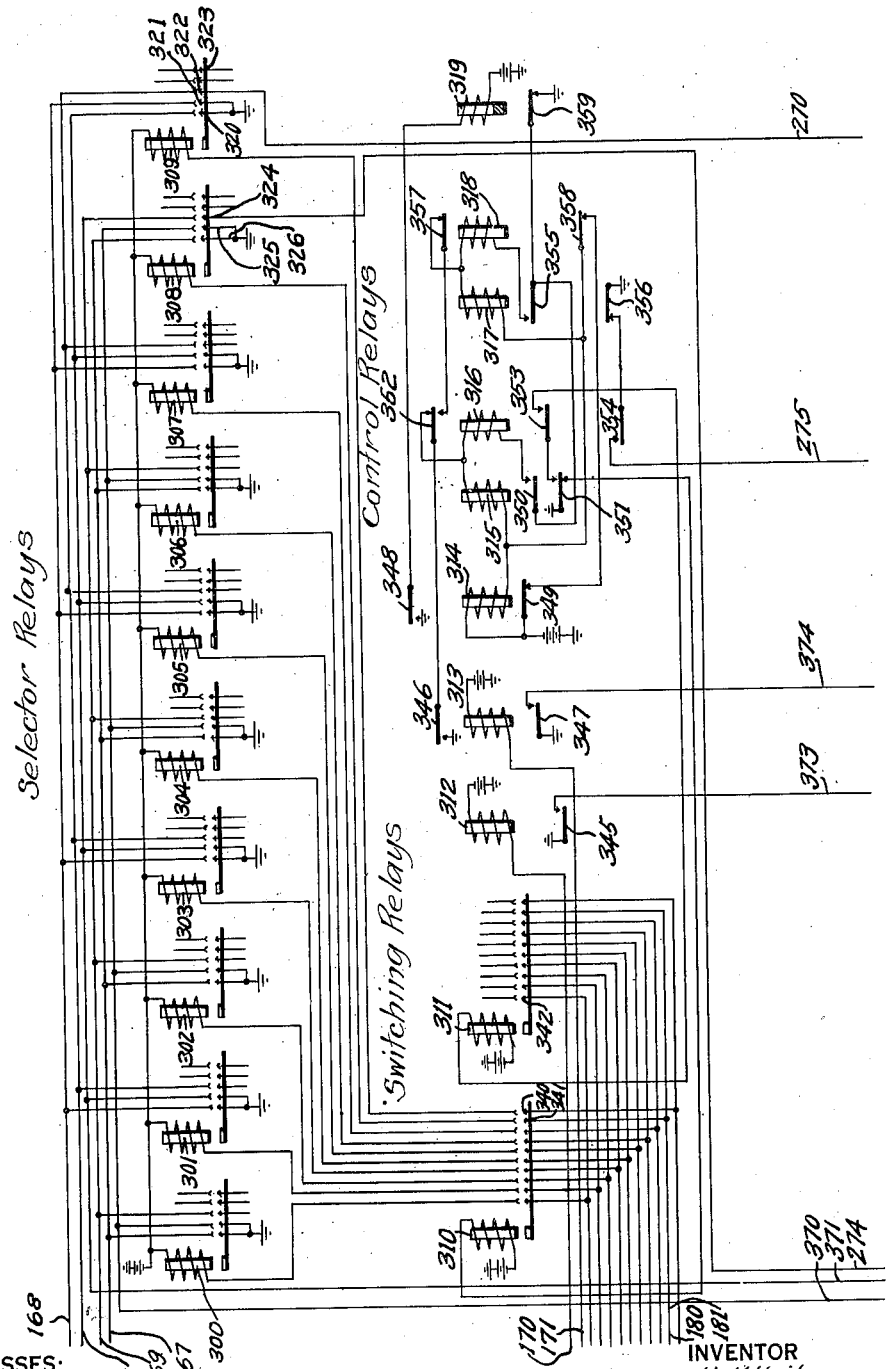

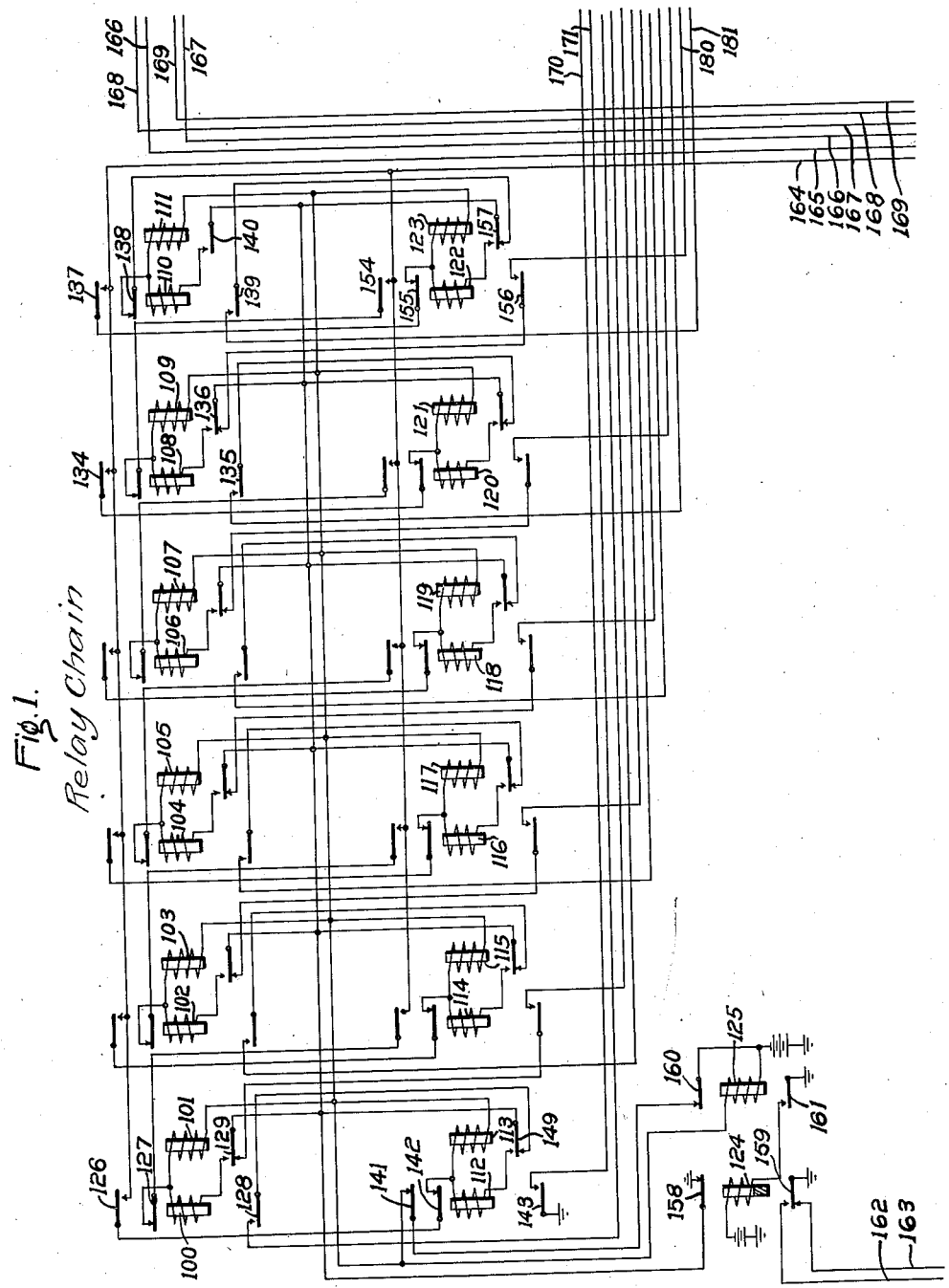

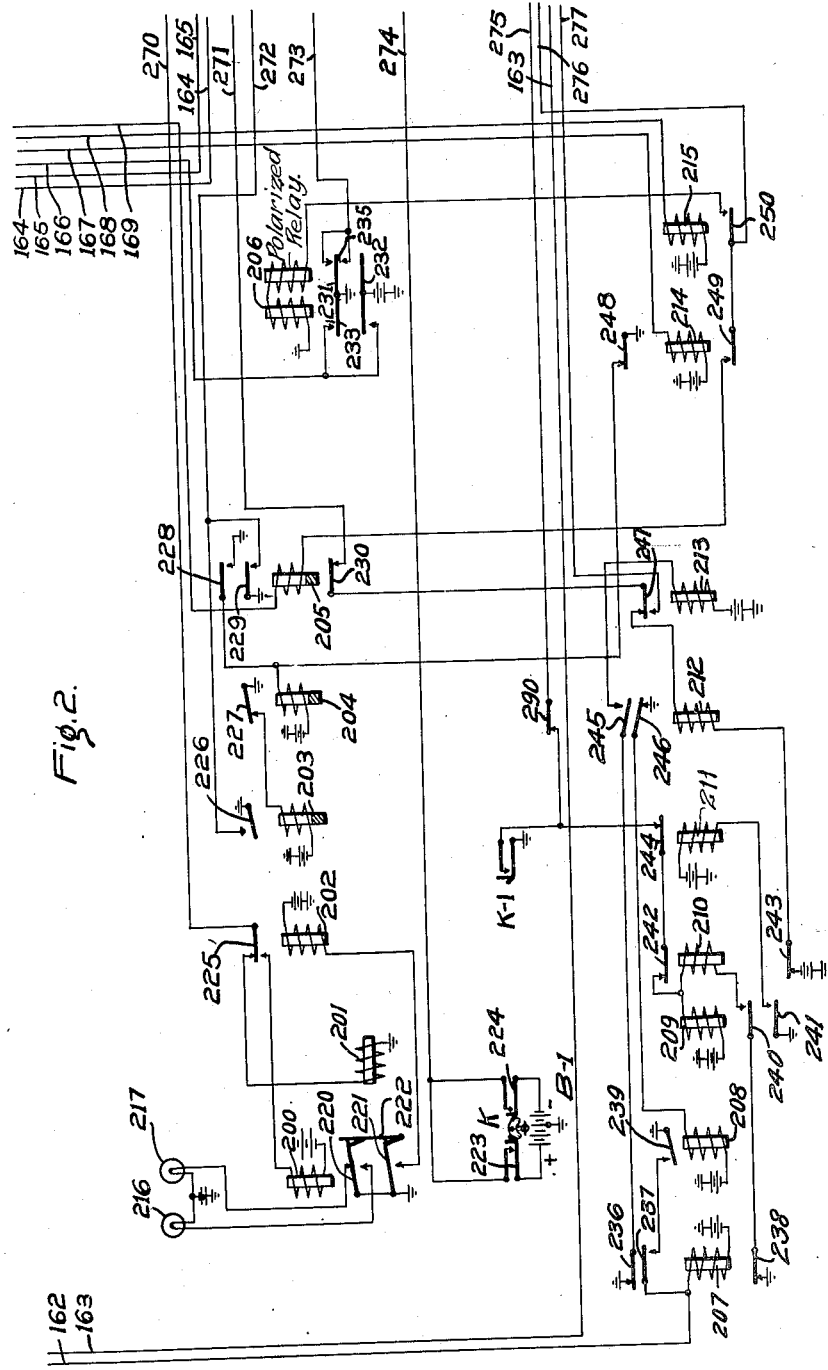

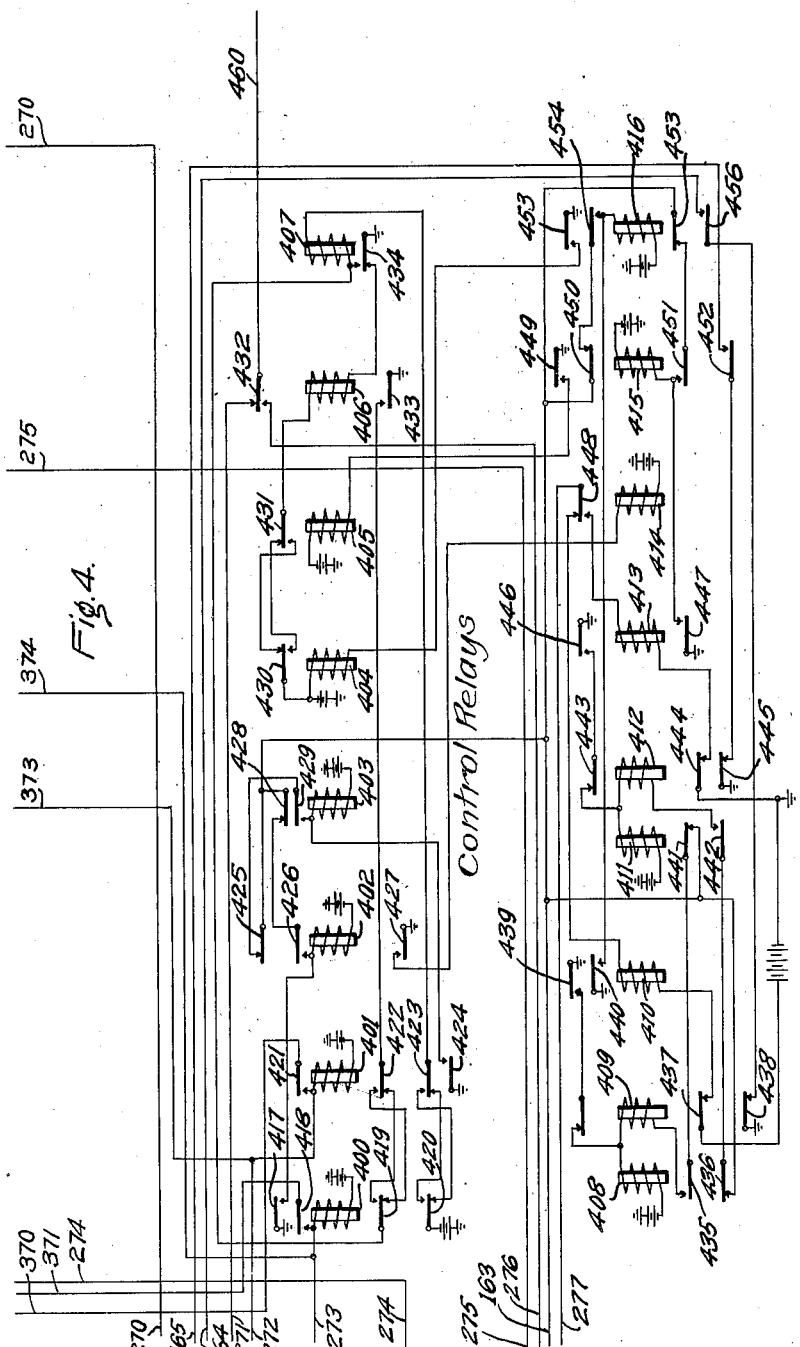

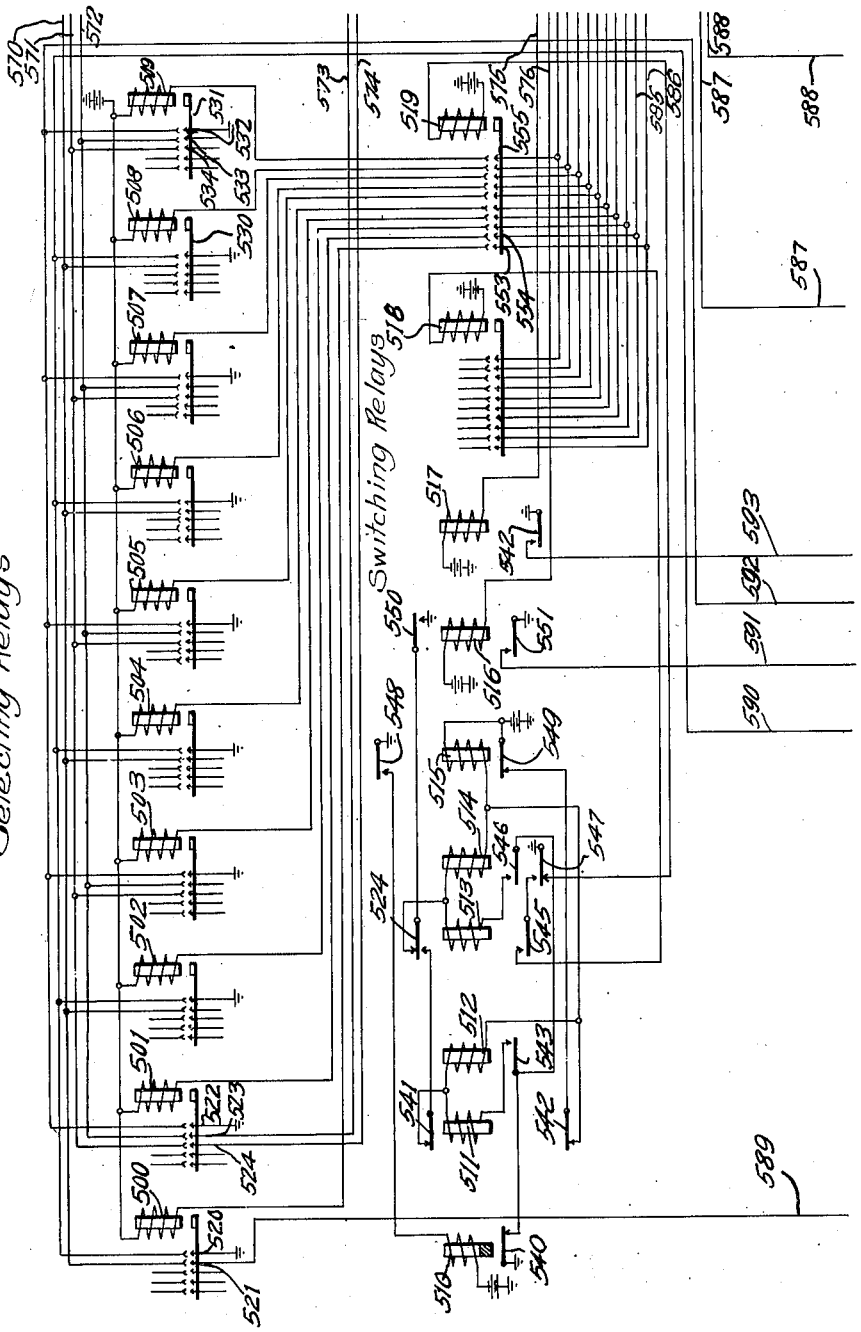

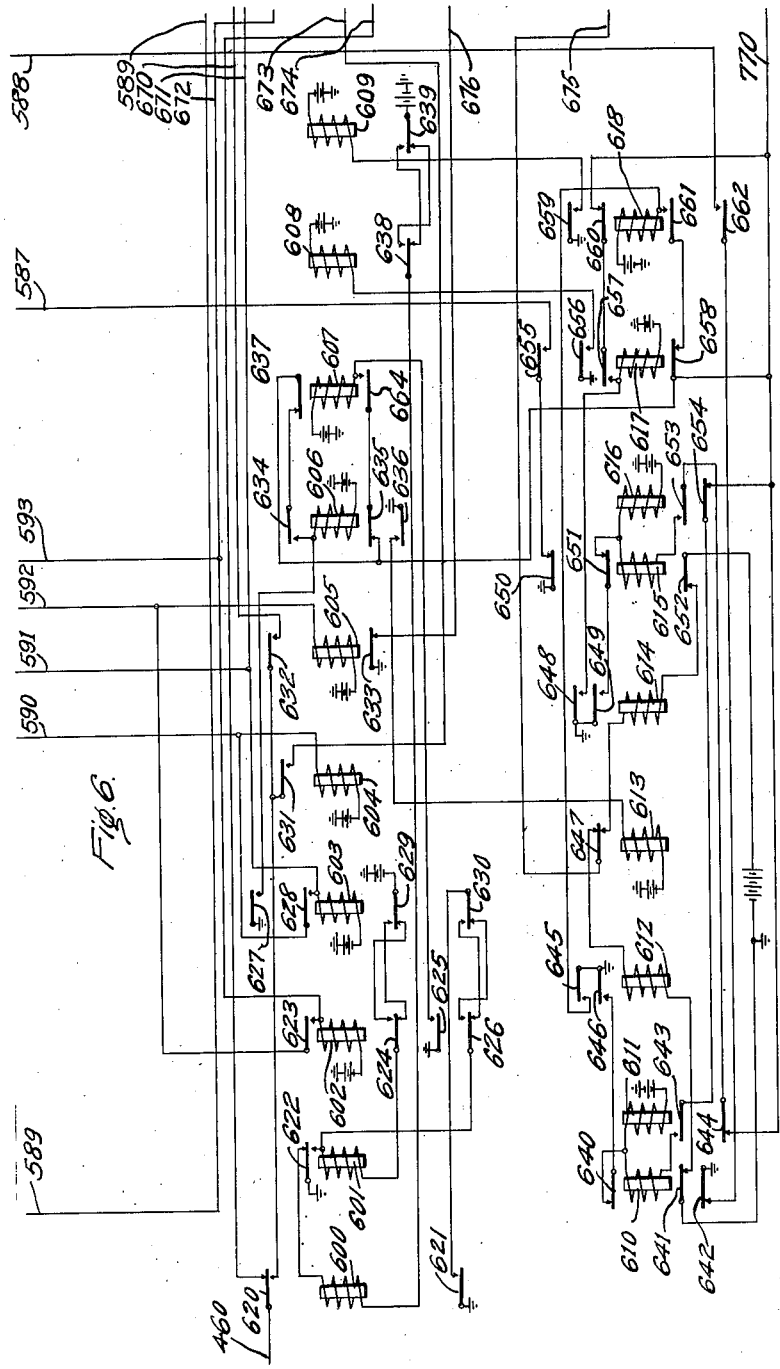

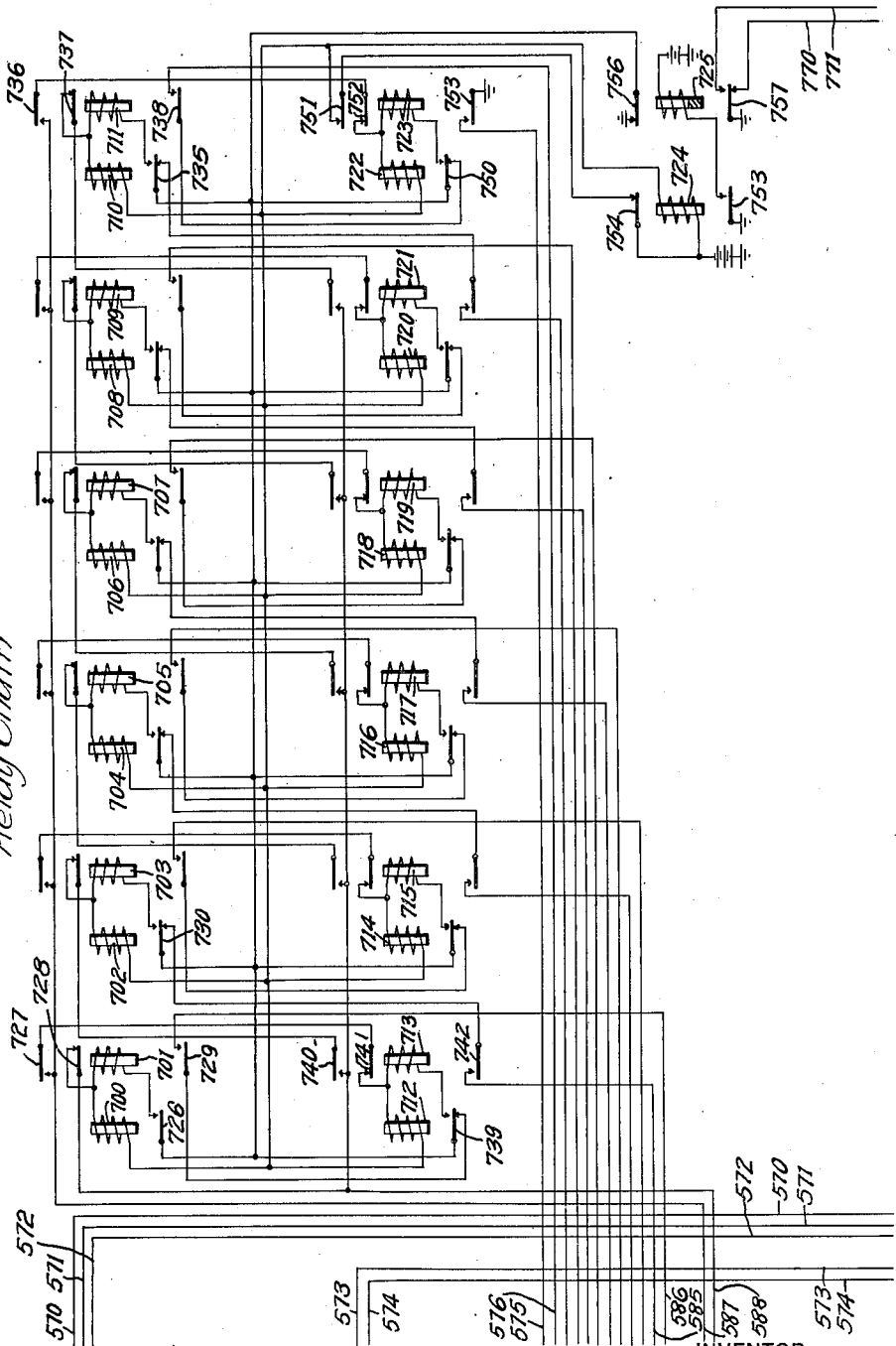

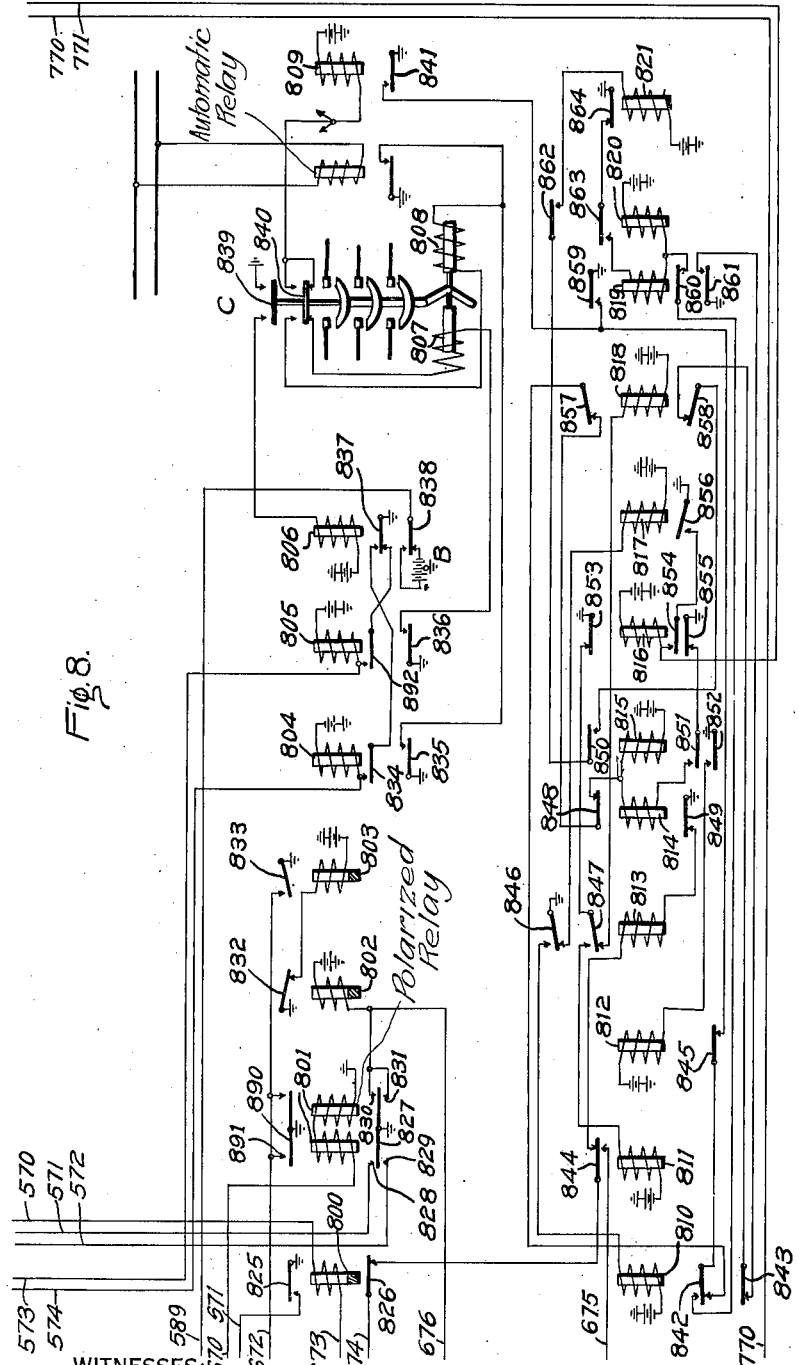

Patented June 24, 1930

1,765,474

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed June 24, 1924. Serial No. 722,037.

My invention relates, in general to control systems and more particularly to supervisory control systems for supervising and controlling remotely-disposed electrical equipment from a central point or dispatcher's office.

One object of my invention is to provide improved circuits and apparatus for supervising and controlling a large number of apparatus units over a single pair of wires between the dispatcher's office and station in which are located the apparatus units that it is desired to supervise and control.

Another object of my invention is to provide improved means for operating a chain of relays at the dispatcher's office and a chain of relays at the station in synchronism over a single pair of wires.

Another object of my invention is to provide improved means for using these wires for both controlling the operation of the apparatus units at the station and for signalling their operation at the dispatcher's office.

There are other objects of the invention which, together with the foregoing, will be described hereinafter with reference to the accompanying drawings.

Referring now to the drawings, comprising Figures 1 to 8, inclusive, sufficient apparatus and circuits have been shown by means of conventional diagrams to enable my invention to be readily explained and understood.

The apparatus and circuits shown in Figs. 1 to 4, inclusive, are those located at the dispatcher's office, while the apparatus and circuits shown in Figs. 5 to 8, inclusive, are those located at the substation.

In practicing my invention, I provide a chain of counting relays at the dispatcher's office and a chain of counting relays, corresponding in number, at the substation in which are located the apparatus units that it is desired to control and supervise. There are two groups of selecting relays associated with each group of counting relays, although the number of groups of selecting relays may be increased in order to increase the capacity of the system. In addition, two switching relays are provided, one for each group of selecting relays.

A control circuit is located at both the dispatcher's office and station for controlling the operation of the counting relays. The counting relay chains and control circuits are connected together by means of a one-conductor trunk line. A ground return circuit is employed, although it is obvious that, instead of using this ground return, a separate circuit may be provided, which is preferable in practice.

In the dispatcher's office, a group of keys are provided corresponding in number to the number of apparatus units that it is desired to control. A common control key is also located at the office.

In order that the dispatcher may be apprised of the condition of the units in the substation, two signalling lamps are provided for each apparatus unit under supervision. Two batteries are provided at the dispatcher's office and at the substation for controlling the operation of the apparatus units and the supervisory signalling devices, as will appear.

When the dispatcher desires to control an apparatus unit at the station or substation, he will operate the key associated with that unit in the proper direction. As a result of this operation, the selection control circuits function to operate the relays in the counting chains at the office and station in a predetermined sequence. The selection control circuit is operated by the alternate application of current from two separate batteries. Checking means are also provided so that, unless the two batteries are connected to the control circuit alternately, the apparatus does not function.

Simultaneously with the first cycle of the counting chains, a switching relay is operated at both the dispatcher's office and substation to connect the relays of one of the auxiliary selecting groups and these relays are operated in a definite sequence under the control of the counting relays. As the selecting relays operate, they alternately connect the signalling apparatus and the control apparatus to the signalling circuit extending between the dispatcher's office and substation.

If no controlling or signalling operation is performed, the controlling and signalling apparatus is merely disconnected from the circuit extending between the dispatcher's office and the substation and the selection control circuit functions. If a signalling or control operation is performed, the selection control circuit remains disconnected until the signalling or control operation is completed. In this manner, it is possible to supervise and control a large number of apparatus units at high speed over a single pair of wires.

If the apparatus unit that it is desired to operate is not selected by the operation of the selecting relays in the first group, the operation of the counting chains will be repeated although, it will be understood, in any event, the counting relays repeat their operation until all the selecting relays have been energized. The previously mentioned switching relays will be released and another switching relay at the dispatcher's office and substation will be operated to connect the relays in the secondary auxiliary selecting groups.

When the proper apparatus unit is selected, battery is connected to the operation control circuit to operate a polarized relay associated with the operation signalling circuit at the substation so that the armature of said relay assumes one position or another position. The operation of the polarized relay causes the apparatus unit that is selected to be operated. In the meantime, the selection control circuit is disconnected from the circuit extending to the dispatcher's office and the relay selecting apparatus maintains connection with the desired unit. When the unit operates, battery at the substation is connected to the supervisory circuit to operate a polarized relay at the dispatcher's office. The operation of the polarized relay controls the operation of the signalling devices to indicate the operation of the selected unit. As a result of the operation of the signalling devices, the selection control circuit is reconnected to the trunk circuit and again starts to function. After all the relays of the auxiliary selecting groups have been operated, the relay selecting apparatus is restored to normal.

In the event that an apparatus unit at the substation operates under the control of automatic devices, responsive to circuit conditions, the operation of the supervisory signalling devices takes place, under the control of the supervisory selecting apparatus, in substantially the same manner as that described.

Referring now more particularly to Fig. 1, relays 100 to 123, inclusive, comprise the group or chain of counting relays at the dispatcher's office. Relays 124 and 125 are control relays for controlling certain releasing operations.

In Fig. 2, a key K is of the usual locking double-throw type. A key K—1 is of the usual non-locking single-throw type. Relays 200 and 201 control the operation of signalling devices 216 and 217 and are so positioned with respect to each other that, when the armature 222 of the relay 201 is in its retracted position, the armatures 220 and 221 of the relay 200 are adapted to be maintained in their operated position. The relay 202 is of the usual type and controls the operation of the relays 200 and 201. Relays 203 to 205, inclusive, and relays 207 to 215, inclusive, Fig. 2, comprise a portion of the control circuit. The relay 206 is a polarized relay that is adapted to operate its armatures 231 and 232 into one position when the current flow through its winding is in a certain direction and to operate the armatures in the opposite direction when the current flow through the winding is in the opposite direction.

In Fig. 3, relays 300 to 309, inclusive, are multi-contract relays and comprise the first selecting group. Relays 310 and 311 are multi-contact switching relays. Relays 312 and 313 control certain switching operations. Relays 314 to 319, inclusive, Fig. 3, and relays 400 to 416, inclusive, Fig. 4, comprise the remainder of the control circuit at the dispatcher's office.

Relays 500 to 509, inclusive, Fig. 5, comprise the first group of selecting relays at the substation. The relays 518 and 519 are multi-contact switching relays. Relays 510 to 517, inclusive, comprise a portion of the control circuit. Of the selecting relays 500 to 509, inclusive, the even-numbered relays connect the signal-controlling relays to the transmission circuit between the dispatcher's office and the controlled station, while the odd-numbered relays of this group connect the operation controlling relays to the transmission circuit. In Fig. 6, relays 600 to 618, inclusive, comprise another portion of the control circuit.

In Fig. 7, relays 700 to 723, inclusive, constitute the group or chains of counting relays at the substation. The relays 724 and 725 control certain releasing operations.

In Fig. 8, relays 800, 809 and 810 to 821, inclusive, comprise the remaining portion of the control circuit at the substation. Relays 802 to 806, inclusive, are provided for controlling the operation of the circuit breaker C and also the application of the signalling current to the control circuit. The relay 801 is a polarized relay similar to the relay 206 previously described. The circuit breaker C is of the usual type and may perform any desired operation at the substation.

Having described the apparatus shown in the drawings, I will now explain its detailed operation. For this purpose, it will be assumed that the dispatcher desires to close the circuit breaker C. In order to accomplish this result, the dispatcher will operate the key corresponding to this unit in the proper direction. It will be assumed that the key K, which is the one associated with the circuit breaker C, is operated whereby the spring 224 engages its working contact. The dispatcher will now operate the key K—1 momentarily.

In the normal condition of the system, there is a holding circuit completed which extends from battery by way of back contact and armature 243, holding relay 212, back contact and armature 247, armature 230 and its back contact, conductor 271, back contact and armature 432, trunk conductor 460, armature 620 and its back contact, conductor 674, armature 826 and its back contact, armature 844 and its back contact, holding relay 813 and back contact and armature 849 to ground. The holding relay 212 and 813 are energized over this circuit.

The switching relay 310 at the dispatcher's office is normally energized over a path which extends from ground by way of armature 351 and its back contact and relay 310 to battery.

The switching relay 519 at the substation is normally energized over a path extending from ground by way of armature 547 and its back contact and relay 519 to battery.

The relay 212, upon being energized, completes a circuit for the relay 208 at armature 246 and at armature 245 opens one point in the circuit of the relay 213. The relay 208 operates to open one point in the locking circuit of the relay 207.

At the substation, the relay 813, upon being operated, opens the circuit of the relay 810 at armature 846, completes a circuit for the relay 817 at the front contact of this armature, opens the circuit of the relay 811 at armature 847, and at the front contact of this armature completes a circuit for the relay 818. The relay 810 is deenergized to prepare one point in the starting circuit at armature 842. The relay 811 prepares a point in the circuit of relay 813. The relay 817 operates to open one point in the locking circuit of the relay 816 at armature 856.

When the key K—1 is operated, a circuit is completed which extends from ground by way of the springs of said key, back contact and armature 244, armature 242 and its back contact and relay 209 to battery. The relay 209 is energized to complete a circuit which extends from ground by way of back contact and armature 238, armature 240 and its front contact, relay 210 and relay 209 to battery, and to complete a circuit for the relay 211 at armature 241.

The relay 211 is energized to remove the short-circuit from the winding of the relay 210 and this relay is operated to open the circuit of the holding relays 212 and 813 at armature 243. The relay 212, upon being deenergized, completes a circuit for the relay 213 at armature 245 and opens the circuit of the relay 208 at armature 246. The relay 213, upon being energized, prepares a point in the circuit of the line relay 410 at armature 247.

At the substation, the relay 813, upon being deenergized, opens the circuit of the relay 817 at armature 846, completes a circuit for the relay 810 at the back contact of this armature, opens a circuit for the relay 818 at armature 847 and completes a circuit for the relay 811 at the back contact of this armature. The relay 817, upon being deenergized, prepares a locking circuit for the relay 816 at armature 856. The relay 818 is deenergized to open one point in the starting circuit at armature 857 and to open another point in the circuit of the relay 821 at armature 858. The relay 810 is energized to prepare another starting circuit at armature 842 and to open another point in the circuit of the relay 821 at armature 843.

The relay 811 is energized to complete a selection control circuit at armature 844. This circuit extends from battery by way of armature 437 and its back contact, line relay 410, back contact and armature 448, conductor 277, front contact and armature 247, armature 230 and its back contact, conductor 271, back contact and armature 432, trunk conductor 460, armature 620 and its back contact, conductor 674, armature 826 and its back contact, armature 844 and its front contact, conductor 675, armature 647 and its back contact, line relay 612, and back contact and armature 641 to ground. The line relays 410 and 612 are energized over the above circuit.

The line relay 410, upon operating, completes a circuit for the relay 408 at armature 439 and at armature 440 completes a circuit for the relay 416. The relay 408 operates to open one point in the circuits of the relays 411 and 412 at armature 436, and at armature 435 completes a circuit which extends from ground by way of armature 159 and its back contact, conductor 163, back contact and armature 441, armature 435 and its front contact, relay 409 and relay 408 to battery. The above circuit is not effective until the original energizing circuit of the relay 408 is opened, by reason of the fact that the relay 409 is short-circuited.

The relay 416, upon being operated, opens one point in the locking circuit of the relay 415 at armature 453, establishes a locking circuit for itself at armature 454 to ground upon grounded conductor 163, and completes a circuit for the relay 404 at armature 453. Another result of the operation of the relay 416 is that a circuit is completed which extends from ground by way of armature 438 and its back contact, armature 456 and its front contact, conductor 164, armature 138 and its back contact, counting relay 111, back contact and armature 141 and back contact and armature 160 to battery.

The relay 111 is energized over the above circuit and operates to complete a circuit, at armature 140, which extends from ground by way of back contact and armature 158, armature 140 and its front contact, relay 110, relay 111, back contact and armature 141 and back contact and armature 160 to battery. The above circuit is not effective until the original energizing circuit for the relay 111 is opened.

The relay 404 operates to complete a circuit for the relay 406 over a path which extends from battery by way of armature 430 and its front contact, back contact and armature 431, relay 406 and back contact and armature 434 to ground. The relay 406 operates to open the circuit of the line relay 410 at armature 432 and to connect the trunk conductor 460 to the conductor 276 at the front contact of this armature. Another result of the operation of the relay 406 is that a circuit is prepared for the relay 407 at armature 433.

When the circuit of the line relay 410 is opened, this relay is deenergized to remove the short-circuit from the winding of the relay 409. The relay 409 operates to open another point in the circuit of the relay 410 at armature 437, and at armature 438 removes the short-circuit from the counting relay 110. The counting relay 110 operates to prepare a circuit for the relay 123 at armature 137, to open another point in the original energizing circuit of the relay 111 at armature 138, and at armature 139 to complete a circuit which extends from ground by way of back contact and armature 158, armature 157 and its back contact, armature 139 and its front contact, conductor 181, spring 340 and its working contact and selecting relay 309 to battery.

The selecting relay 309 is energized to apply ground to the conductors 168 and 371 at springs 320 and 321 and to prepare a signalling circuit at spring 322. The grounding of conductor 371 merely prepares a locking circuit for the relay 400. The ground potential upon the conductor 168 brings about the energization of the relay 215. The polarized relay 206 is now connected to the signalling circuit.

At the substation, the line relay 612, upon being energized, completes a circuit for the relay 611 at armature 646 and at armature 645 completes a circuit for the relay 618. The relay 611, upon being energized, opens one point in the circuits of the relays 615 and 616 at armature 644 and at armature 643 completes a circuit which extends from ground by way of armature 757 and its back contact, conductor 770, back contact and armature 654, armature 643 and its front contact, relay 610 and relay 611 to battery. The relay 610 is short-circuited as long as the original energizing circuit for the relay 611 is maintained.

The relay 618, upon operating, opens one point in the locking circuit of the relay 617 at armature 660, establishes a locking circuit for itself at armature 661 and completes a circuit for the relay 609 at armature 659. The relay 609 is operated to complete a circuit which extends from battery by way of armature 639 and its front contact, armature 638 and its back contact, relay 600 and back contact and armature 622 to ground.

Another result of the operation of the relay 618 is that a circuit is completed extending from ground by way of armature 642 and its back contact, armature 662 and its front contact, conductor 588, armature 728 and its back contact, counting relay 700, back contact and armature 751 and back contact and armature 754 to battery.

The counting relay 700 is energized over the above circuit and operates to complete the circuit of the relay 701 over a path which extends from ground by way of back contact and armature 756, armature 726 and its front contact, relay 701, relay 700, back contact and armature 751 and back contact and armature 754 to battery. The relay 701 is short-circuited as long as the original energizing circuit of the relay 700 is maintained.

The relay 600 is energized over a previously traced circuit and operates to open the circuit of the line relay 612 at armature 620, and to prepare a signalling circuit at the front contact of this armature. Another result of the operation of the relay 600 is that a circuit is prepared for the relay 601 at armature 621.

The relay 612, upon being deenergized, removes the short-circuit from the relay 610 and this relay is permitted to operate. As a result of the operation of the relay 610, the short-circuit is removed from the counting relay 700 and this relay is permitted to operate. The relay 701, upon operating, prepares a circuit for the counting relay 712 at armature 727, opens another point in the original energizing circuit of the relay 700 at armature 728, and at armature 729 completes a circuit extending from ground by way of back contact and armature 756, armature 739 and its back contact, armature 729 and its front contact, conductor 586, spring 553 and its working contact and selecting relay 500 to battery.

The selecting relay 500, upon being operated, places ground upon conductor 590 at spring 520 and at spring 521 prepares a signalling circuit. The ground potential upon the conductor 590 merely causes the energization of the relay 604. The relay 604 operates to complete a supervisory signalling circuit.

This signalling circuit now extends from the negative pole of the battery B at the substation, back contact and armature 838, conductor 589, spring 521 and its working contact, conductor 570, slow-acting relay 800, conductor 673, front contact and armature 631, front contact and armature 620, trunk conductor 460, armature 432 and its front contact, conductor 276, armature 250 and its front contact and polarized relay 206 to ground.

The polarized relay 206 now operates its armatures 231 and 232 so that the armature 231 is forced into engagement with the springs 233 and 235, whereby ground potential is placed upon the conductor 166 and upon the conductor 273. The conductor 166 extends by way of the working contact of spring 322 of the selecting relay 309 and said spring, conductor 270, armature 225 and its back contact and relay 201 to ground. The relay 201 is not energized at this time by reason of the fact that the signalling device 217 is operated to indicate that the circuit breaker C is in an open position, the circuits obviously being arranged to energize relay 201 upon closing of the circuit breaker. The circuit to relay 201 with the circuit breaker closed is from ground at armature 231 to ground at relay 201 with no battery.

The connection of ground to conductor 273 completes a circuit for the relay 400. The relay 400 operates to establish a locking circuit for itself at armature 418 from ground through battery, winding of relay 400, front contact and armature 418, conductor 371, and contact 320 to ground, to complete a circuit for the relay 402 at armature 417 and to complete a circuit for the relay 407 at armatures 419 and 420. The relay 407 is energized over a path which extends from ground by way of armature 433 and its front contact, armature 422 and its back contact, front contact and armature 419, relay 407, armature 423 and its back contact and front contact and armature 420 to battery.

The relay 402 operates to establish a locking circuit for itself at armature 426 to ground upon the conductor 163, to open one point in the locking circuit of the relay 403 at armature 425 and to complete a circuit for the relay 414 at armature 427. The relay 414 operates to prepare a circuit for the line relay 413 at armature 448. The relay 407 is energized to open the circuit of the relay 406 at armature 434 and to establish a locking circuit for itself at the front contact of this armature. The relay 406 is deenergized to open one point in the original energizing circuit of the relay 407 at armature 433 and to reestablish one point in the control circuit. By the deenergization of the relay 406, the previously traced signalling circuit is opened and, consequently, the polarized relay 206 is deenergized and the circuit of the slow-acting relay 800 is opened.

At the substation, the relay 800 is energized in series with the polarized relay 206. The relay 800 operates to open one point in the trunk or control circuit at armature 826 and to complete a circuit, at armature 825, which extends from ground by way of said armature and its front contact, conductor 671 and relay 603 to battery. The relay 603 is energized to establish a locking circuit for itself at armature 628 from ground through battery, winding of relay 603, front contact and armature 628, conductor 590, contact 521 and ground, to complete a circuit for the relay 606 at armature 627 and to complete a circuit for the relay 601 at armatures 629 and 630. The circuit over which the relay 601 is energized extends from ground by way of armature 621 and its front contact, armature 630 and its front contact, back contact and armature 626, relay 601, armature 624 and its back contact, and front contact and armature 629 to battery.

The relay 606, upon being energized, opens one point in the locking circuit of the relay 607 at armature 635, establishes a locking circuit for itself at armature 634 to ground upon the grounded conductor 770 and completes a circuit for the relay 613 at armature 636. The relay 613 is energized to prepare one point in the circuit of the line relay 614. The relay 601 is energized to open the circuit of the relay 600 at armature 622 and to establish a locking circuit for itself at the front contact of this armature. The relay 600, upon being deenergized, opens one point in the original energizing circuit of the relay 601 at armature 621, at armature 620 opens another point in the signalling circuit and at the back contact of this armature reestablishes one point in the trunk circuit.

Upon the deenergization of the slow-acting relay 800, which occurs a short interval of time after the signalling circuit has been opened, as before described, the selection control circuit is completed. This circuit extends from ground by way of armature 444 and its back contact, line relay 413, front contact and armature 448, conductor 277, front contact and armature 247, armature 230 and its back contact, conductor 271, back contact and armature 432, trunk conductor 460, armature 620 and its back contact, conductor 674, armature 826 and its back contact, armature 844 and its front contact, conductor 675, armature 647 and its front contact, line relay 614 and back contact and armature 652 to battery. The line relays 413 and 614 are now energized in series.

The relay 413, upon being energized, establishes a circuit for the relay 411 at armature 446 and at armature 447 completes a circuit for the relay 415. The relay 411 operates to open the circuit of the relays 408 and 409 at armature 441, and to prepare a circuit for the relay 412 at armature 442. The relay 408, upon being deenergized, opens one point in the circuit of the relay 409 at armature 435, and at armature 436 completes a circuit which extends from the grounded conductor 163, back contact and armature 436, armature 442 and its front contact, relay 412 and relay 411 to battery. This circuit is not effective so long as the original energizing circuit for the relay 411 is closed. The relay 409, upon being deenergized, prepares one point in the circuit of the line relay 410.

The relay 415, upon operating, completes a circuit for the relay 405 at armature 449, opens the locking circuit of the relay 416 at armature 450 and completes a locking circuit for itself at armature 451. The relay 416 is deenergized to open the circuit of the relay 404 at armature 453 and to establish a locking circuit for the relay 415 at armature 453. The relay 404 is deenergized to prepare one point in the circuit of the relay 406. The relay 405 is energized to prepare a circuit for the relay 406.

Another result of the operation of the relay 415 is that a circuit is completed extending from ground at armature 445 and its back contact, armature 452 and its front contact, conductor 165, front contact and armature 137, armature 155 and its back contact, counting relay 123, back contact and armature 141 and back contact and armature 160 to battery. The counting relay 123 is energized over the above circuit and operates to open the circuit of the selecting relay 109 at armature 157 and to complete a circuit for the counting relay 122 at the front contact of this armature. The relay 122 is not energized so long as the original energizing circuit of the relay 123 is maintained.

The selecting relay 309, upon being deenergized, opens one point in the signalling circuit at spring 322, and at springs 320 and 321 removes ground from conductors 371 and 168, respectively. By the removal of ground from conductor 168, the circuit of the relay 215 is opened and this relay is deenergized to open another point in the signalling circuit. By the removal of ground from conductor 371, the locking circuit of the relay 400 is opened and this relay is deenergized to open the locking circuit of the relay 407.

The relay 407 is deenergized to complete a circuit which extends from ground by way of back contact and armature 434, relay 406, armature 431 and its front contact and back contact and armature 430 to battery. The relay 406 operates to prepare one point in the circuit of the relay 407 at armature 433, at armature 432 opens the circuit of the line relay 413 and at the front contact of this armature prepares a signalling circuit.

When the circuit of the line relay 413 is opened, this relay is deenergized to permit the energization of the relay 412. The relay 412 operates to open another point in the circuit of the relay 413 at armature 444, to open another point in the original energizing circuit of the relay 411 at armature 443 and to open the original energizing circuit of the counting relay 123 at armature 445. As the short-circuit is removed from the relay 122 by this operation, the relay 122 is energized. The relay 122 operates to prepare a circuit for the counting relay 109 at armature 154, to open another point in the original energizing circuit of the relay 123 at armature 155 and to complete a circuit which extends from ground by way of back contact and armature 158, armature 136 and its back contact, armature 156 and its front contact, conductor 180, spring 340 and its working contact, and second selecting relay 308 to battery.

The second selecting relay 308 is energized to prepare a signalling circuit at spring 324 and to place ground upon the conductors 167 and 370 at springs 326 and 325, respectively. The grounding of conductor 370 prepares a locking circuit for the relay 401. The grounding of conductor 167 brings about the energization of the relay 214. The relay 214 is energized to prepare a signaling circuit at armature 249 and to open the circuit of the slow-acting relay 204 at armature 248.

At the substation, the line relay 614 operates to complete a circuit for the relay 617 at armature 648 and to complete a circuit for the relay 616 at armature 649. The relay 616 is energized to open the circuit of the relays 610 and 611 at armature 654 and to prepare a circuit at armature 653 for the relay 615. The relay 610, upon being deenergized, prepares a circuit for the relay 611 at armature 640 and prepares a circuit for the relay 612 at armature 641. The relay 611 is deenergized to open one point in the circuit of the relay 610 at armature 643 and to establish a circuit which extends from the grounded conductor 770 by way of armature 644 armature 653 and its front contact, relay 615 and relay 616 to battery. This circuit is not effective so long as the original energizing circuit for the relay 616 is maintained.

The relay 617, upon operating, completes a circuit for the relay 608 at armature 656, prepares a locking circuit for itself at armature 657, and at armature 658 opens the locking circuit for the relay 618. The relay 618 is deenergized to open the circuit of the relay 609 at armature 659 and to establish a locking circuit for the relay 617 at armature 660. The relay 609 is deenergized to prepare one point in the circuit of the relay 600. The relay 608 is energized for the same purpose.

Another result of the operation of the relay 617 is that a circuit is completed which extends from ground by way of armature 650 and its back contact, armature 655 and its front contact, conductor 587, front contact and armature 727, armature 741 and its back contact, relay 712, back contact and armature 751 and back contact and armature 754 to battery. The counting relay 712 is energized over the above circuit and operates to open the circuit of the selecting relay 500 at armature 739 and to establish a circuit for the relay 713. The circuit of the relay 713 is not effective so long as the original energizing circuit for the relay 712 is maintained.

The selecting relay 500 is deenergized to open another point in the signalling circuit at armature 521 and to remove ground from the conductor 590 at spring 520. The removal of ground from conductor 590 effects the deenergization of the relays 603 and 604. The relay 604 is deenergized to open another point in the signalling circuit at armature 631. The relay 603 is also deenergized to open the locking circuit of the relay 601. The relay 601 is deenergized to complete a circuit extending from ground by way of armature 622 and its back contact, relay 600, armature 638 and its front contact and back contact and armature 639 to battery.

The relay 600 is energized to open the circuit of the line relay 614 at armature 620, to prepare a signalling circuit at the front contact of this armature and to prepare a circuit for the relay 601 at armature 621. The opening of the circuit of the line relay 614 causes this relay to be deenergized to remove the short-circuit from the relay 615. The relay 615 operates to open another point in the circuit of the line relay 614 at armature 652, to open another point in the original energizing circuit of the relay 616 at armature 651, and to open the original energizing circuit for the counting relay 713 at armature 650.

The relay 713 is energized to prepare a circuit for the counting relay 702 at armature 740, to open another point in the original energizing circuit of the relay 712 at armature 741, and to complete a circuit extending from ground by way of back contact and armature 756, armature 730 and its back contact, armature 742 and its front contact, conductor 585, spring 554 and its working contact and second selecting relay 501 to battery.

The selecting relay 501 is energized to prepare certain signalling circuits at springs 523 and 524 and to place ground upon the conductor 592 at spring 522. The grounding of conductor 592 completes a circuit for the relay 605. The relay 605 is energized to prepare a signalling circuit at armature 632 and to remove ground from conductor 676 at armature 633. The removal of ground from conductor 676 opens the circuit of the slow-acting relay 802.

A control signalling circuit is now completed, inasmuch as the key K has been operated. This signalling circuit extends from the negative pole of the battery B—1 at the dispatcher's office by way of spring 224 and its working contact, conductor 274, spring 324 and its working contact, conductor 169, slow-acting relay 205, front contact and armature 249, conductor 276, front contact and armature 432, trunk conductor 460, armature 620 and its front contact, armature 632 and its front contact, conductor 670 and polarized relay 801 to ground.

The polarized relay 801 is energized so as to cause the armature 827 to engage contacts 829 and 830 and to cause the armature 890 to engage the contact 891. As a result of these operations, a circuit is closed for the relay 802 and, consequently, this relay is not deenergized. Ground is also placed upon the conductor 672 and upon the conductor 572. The grounding of conductor 572 completes a circuit which extends from ground by way of said conductor, working contact of spring 523 and said spring, conductor 573 and relay 805 to battery.

The relay 805 is energized to complete a circuit for the closing coil 807 of the circuit breaker C at armature 836, and to establish a locking circuit for itself at armature 892. The circuit breaker C operates in the usual manner to perform any one of a number of desired operations. As a result of the operation of the circuit breaker C, the relay 806 is energized to open the locking circuit of the relay 805. The circuit of the closing coil 807 is, of course, opened at the pallet switch 840 upon the closing of the circuit breaker C. The common low-resistance relay 809 is energized in series with the closing coil 807. Effects of the operation of this relay will be considered hereinafter.

When ground is placed upon the conductor 672, as previously described, a circuit is completed for the relay 602. The relay 602 operates to establish a locking circuit for itself at armature 623, to complete a circuit for the relay 607 at armature 625 and to complete a circuit, at armatures 624 and 626, which extends from ground by way of armature 621 and its front contact, armature 630 and its back contact, front contact and armature 626, relay 601, armature 624 and its front contact and back contact and armature 629 to battery. The relay 601 is energized over this circuit to open the circuit of the relay 600 at armature 622 and to establish a locking circuit for itself at the front contact of this armature. The relay 600 is deenergized to open the signalling circuit and to prepare one point in the control circuit.

The relay 607, upon operating, prepares one point in its locking circuit at armature 664, and at armature 637 opens the locking circuit of the relay 606. The deenergization of the relay 606 establishes a locking circuit for the relay 607 and opens the circuit of the relay 613. The relay 613 is deenergized to prepare one point in the circuit of the relay 612.

By the opening of the signalling circuit, the polarized line relay 801 is deenergized to open the circuit of the slow-acting relay 802 and also to open the circuit of the relay 805.

The relay 805 is deenergized to open another point in the circuit of the closing coil 807.

The slow-acting relay 205, at the dispatcher's office, is energized over the signalling circuit. This relay operates to complete a circuit for the slow-acting relay 204 at armature 228, to open one point in the control circuit at armature 230 and to complete a circuit at armature 229 which extends from ground by way of said armature and its front contact, conductor 272, and relay 401 to battery. The relay 401 is energized to establish a locking circuit for itself at armature 421, to complete a circuit for the relay 403 at armature 424 and to complete a circuit, at armatures 422 and 423, for the relay 407 over a path which extends from ground by way of armature 433 and its front contact, armature 422 and its front contact, back contact and armature 419, relay 407, armature 423 and its front contact, and back contact and armature 420 to battery.

The relay 407 operates to open the circuit of the relay 406 and to establish a locking circuit for itself at armature 434. The relay 406 is deenergized to open another point in the signalling circuit, to reestablish one point in the control circuit at armature 432, and to open one point in the original energizing circuit of the relay 407 at armature 433. The relay 403 operates to open the locking circuit of the relay 402 at armature 428 and to close one point in its locking circuit at armature 429. The relay 402 is deenergized to establish a locking circuit for the relay 403 at armature 425 and to open the circuit of the relay 414 at armature 427. The relay 414 is deenergized to prepare one point in the circuit of the line relay 410 at armature 448.

Upon the deenergization of the slow-acting relay 205, the circuit of the slow-acting relay 204 is opened and a control circuit is established over a path which extends from battery by way of armature 437 and its back contact, line relay 410, back contact and armature 448, conductor 277, front contact and armature 247, armature 230 and its back contact, conductor 271, back contact and armature 432, trunk conductor 460, armature 620 and its back contact, conductor 674, armature 826 and its back contact, armature 844 and its front contact, conductor 675, armature 647 and its back contact, line relay 612 and back contact and armature 641 to ground. The line relays 410 and 612 are now energized in series.

The energization of the line relay 410 causes the operation of the relays 408 and 416. The relay 408 opens the circuits of the relays 411 and 412 and prepares one point in the circuit of the relay 409. The relays 411 and 412 are deenergized to restore certain circuits to normal and to complete a circuit for the relay 409, which is effective when the original energizing circuit for the relay 408 is opened.

The relay 416 is energized to open the locking circuit of the relay 415, to establish a locking circuit for itself and to complete a circuit for the relay 404. The relay 415 is deenergized to establish a locking circuit for the relay 416 and to open the circuit of the relay 405. The relay 405 is deenergized to prepare one point in the circuit of the relay 406 and the relay 404 is deenergized for the same purpose.

The operation of the relay 416 also completes a circuit for the counting relay 103. The counting relay 103 operates to open the circuit of the selecting relay 308 and to prepare a circuit for the counting relay 102. The selecting relay 308 is deenergized to open the locking circuit of the relay 401, to open the circuit of the relay 214 and to open the signalling circuit. The relay 214 is deenergized to open another point in the signalling circuit and to complete another circuit for the slow-acting relay 204.

The relay 401 is deenergized to open the locking circuit of the relay 407. The relay 407 is deenergized to complete a circuit for the relay 406. The relay 406 operates to open the circuit of the line relay 410 and to prepare a signalling circuit. The line relay 410 is deenergized to permit the operation of the relay 409. The relay 409 operates to open the original energizing circuit of the counting relay 103, whereby the counting relay 102 is operated. The counting relay 102 operates to establish a circuit for the selecting relay 307. The selecting relay 307 is energized to place ground upon conductors 168 and 371, and to prepare a signalling circuit. The grounding of conductor 168 brings about the energization of the relay 215. The relay 215 operates to prepare a signalling circuit. The grounding of conductor 371 prepares a locking circuit for the relay 400.

At the substation, the line relay 612 operates to complete a circuit for the relay 611 and for the relay 618. The relay 611 opens the locking circuits of the relays 615 and 616 and prepares a circuit for the relay 610. By the deenergization of the relays 615 and 616, certain circuits are restored to normal and a circuit is completed for the relay 610, which is effective upon the opening of the original energizing circuit for the relay 611. The relay 618 operates to complete a circuit for the relay 609, to open the locking circuit of the relay 617 and to prepare a locking circuit for itself. The relay 617 is deenergized to establish a locking circuit for the relay 618 and to open the circuit of the relay 608. The relay 608 is deenergized and the relay 609 is energized to prepare one point in the circuit of the relay 600.

The operation of the relay 618 also completes a circuit for the counting relay 702.

The counting relay 702 operates to open the circuit of the second selecting relay 501 and to complete a circuit for the relay 703. This latter circuit is ineffective so long as the circuit for the relay 602 is maintained.

The selecting relay 501 is deenergized to open certain signalling circuits and to remove ground from conductor 592, thereby opening the locking circuit of the relay 602 and the circuit of the relay 605. The relay 605 is deenergized to open one point in the signalling circuit. The relay 602 is deenergized to open the circuit of the relay 601. The relay 601 retracts its armature to complete a circuit for the relay 600. The relay 600 operates to open the circuit of the line relay 612 and to prepare a signalling circuit. The relay 612 is deenergized to permit the operation of the relay 610. The relay 610 operates to open the original energizing circuit of the counting relay 702.

The counting relay 703 is now energized to complete a circuit for the selecting relay 502. The selecting relay 502 operates to prepare a signalling circuit and to place ground upon the conductor 590, thus causing the energization of the relay 604. The relay 604 is operated to complete the signalling circuit. By the operation of the signalling circuit, the indication of the supervisory signalling devices at the dispatcher's office (which are lamps similar to 216 and 217) is checked and, upon the operation of the signalling circuit, the control circuit is completed and the line relays 413 and 614 are energized in series.

In the previous case, it will be recalled that the signalling circuit was completed by reason of the fact that the key K was operated, signifying that the dispatcher desired the closure of the circuit breaker C corresponding to this key. It is understood, of course, that the lamps 216 and 217 are supervisory lamps for indicating the actual position of the apparatus unit. In the event that the key K had not been operated, no signalling circuit would have been completed and, consequently, the slow-acting relay 204 at the dispatcher's office and the relay 802 at the substation would have been permitted to deenergize.

The deenergization of the relay 204 at the dispatcher's office opens the circuit of the relay 203. After a short interval of time, the relay 203 is deenergized to place ground upon the conductor 272. The grounding of conductor 272 brings about the same results as if the relay 205, in series with the signalling circuit, had been energized, and thus the control circuit is prepared at the dispatcher's office.

The deenergization of the relay 802, at the substation, opens the circuit of the relay 803. A short interval of time after, the relay 803 is deenergized to place ground upon the conductor 672, whereby the relay 602 is energized and the apparatus is caused to function to prepare a control circuit at the substation. These operations occur whenever the dispatcher does not desire an operation to take place at the substation. Thus, these slow-acting relays are effective to cause the completion of the control circuit at this time.

Returning now to the normal operation of the system, the line relays 410 and 413 are now alternately operated over the control circuit in a manner described. By these operations, the counting relays 115, 114, 105, 104, 117, 116, 107, 106, 119, 118, 109, 108, 121, 120, 111 and 110 are energized in the sequence mentioned.

The selecting relays 306, 305, 304, 303, 302, 301 and 300 are also energized in the sequence mentioned by the operation of the counting relays. Of course, it will be understood that the trunk circuit is alternately switched between the line relays and the signalling circuits, as before described.

At the substation, the line relays 612 and 614 are alternately operated by the control circuit in the same manner as before. The counting relays 714, 715, 704, 705, 716, 717, 706, 707, 718, 719, 708, 709, 720, 721, 710 and 711 are energized by the operation of the control circuit in the sequence mentioned.

The selecting relays 503 to 509, inclusive, are energized by the operation of the counting relays. The trunk circuit at the substation is also switched between the control circuit and the signalling circuit. By this means, the control and signalling operations, as well as the selective operations, are performed over a single pair of wires.

At the dispatcher's office, the line relay 410 and the relay 416 are energized to bring about the operation of the counting relay 101. The counting relay 101 operates to open the circuit of the selecting relay 300 and completes a circuit for the relay 100. The relay 300 is deenergized to remove ground from the conductor 370 and also from the conductor 167, in addition to opening certain signalling circuits.

The removal of ground from conductor 167 brings about the deenergization of the relay 214. The relay 214 retracts its armature to complete a circuit for the slow-acting relay 204 and to open another point in the signalling circuit. The removal of ground from conductor 370 opens the locking circuit of the relay 401 and this relay is deenergized to open the circuit of the relay 407. The relay 407 is deenergized to open the circuit of the line relay 410. The line relay 410 is deenergized to permit the operation of the relay 409. The relay 409 is energized to bring about the operation of the relay 100.

The relay 100 operates to complete a circuit extending from ground by way of back contact and armature 158, armature 149 and its back contact, armature 128 and its front contact, conductor 171, and relay 313 to battery. The relay 313 is operated to place ground upon the conductor 374, thereby completing a circuit for the relay 400. The relay 400 operates to complete a circuit for the relay 407 and also for the relay 402. The relay 402 operates to complete a circuit for the relay 414 and to open the locking circuit of the relay 403. The relay 403 is deenergized to establish a locking circuit for the relay 402. The relay 414 is operated to prepare a circuit for the line relay 413. The relay 407 is energized to open the locking circuit of the relay 406. The relay 406 is deenergized to prepare one point in the control circuit.

Another result of the operation of the relay 313 is that a circuit is completed, at armature 346, which extends from ground by way of front contact and said armature, armature 352 and its back contact, relay 315, armature 358 and its back contact and armature 349 to battery. The relay 315 is energized over this circuit and operates to open the circuit of the switching relay 310 at armature 351, to prepare one point in the circuit of the switching relay 311 at the front contact of this armature, and to complete a circuit extending from ground by way of back contact and armature 359, armature 350 and its front contact, relay 316, relay 315, armature 358 and its back contact and back contact and armature 349 to battery. This circuit is not effective so long as the original energizing circuit for the relay 315 is maintained.

At the substation, the line relay 612 and the relay 618 are energized to bring about the operation of the counting relay 710. The counting relay 710 is operated to open the circuit of the selecting relay 509 and to prepare a circuit for the relay 711. The selecting relay 509 is deenergized to remove ground from conductor 592, thereby opening the circuit of the relay 605, and also the locking circuit of the relay 602. The relay 605 is deenergized to open one point in the signalling circuit and to reestablish the circuit of the slow-acting relay 802.

The relay 602 is deenergized to open the locking circuit of the relay 601. The relay 601 retracts its armature to complete a circuit for the relay 600. The relay 600 operates to open the circuit of the line relay 612. The relay 612 is deenergized to permit the energization of the relay 610. The relay 610 operates to open the original energizing circuit of the counting relay 710, thus permitting the energization of the relay 711. The counting relay 711 is energized to complete a circuit extending from ground by way of back contact and armature 756, armature 750 and its back contact, armature 738 and its front contact, conductor 576 and relay 516 to battery.

The relay 516 is energized to place ground upon the conductor 591, thereby completing the circuit for the relay 603. The relay 603 is operated to complete a circuit for the relay 606 at armature 627 and to complete a circuit for the relay 601. The relay 606 is energized to open the locking circuit of the relay 607 and to complete a circuit for the relay 613. The relay 613 is energized to prepare a circuit for the line relay 614. The relay 601 is energized to open the circuit of the relay 600. The relay 600 is deenergized to reestablish the trunk circuit, whereby the line relays 413 and 614 are energized in series.

Another result of the operation of the relay 516 is that a circuit is completed extending from ground by way of front contact and armature 550, armature 524 and its back contact, relay 514, back contact and armature 542 and back contact and armature 549 to battery. The relay 514 is energized over the above circuit and operates to open the circuit of the switching relay 519 at armature 547, to prepare a circuit for the switching relay 516 at the front contact of this armature, and to complete a circuit which extends from ground by way of armature 540 and its back contact, armature 546 and its front contact, relay 513, relay 514, back contact and armature 542 and back contact and armature 549 to battery. The relay 513 is not energized so long as the original energizing circuit of the relay 514 is maintained.

At the dispatcher's station, the line relay 413 operates to complete the circuits of the relays 411 and 415. The relay 411 opens the circuits of the relays 408 and 409 and prepares a circuit for the relay 412. The relay 415 opens the locking circuit of the relay 416 and completes a circuit for the relay 405. The relay 416 is deenergized to establish the locking circuit of the relay 415 and to open the circuit of the relay 404. The relay 404 is deenergized and the relay 405 is energized to prepare a circuit for the relay 406.

Another result of the operation of the relay 415 is that a circuit is closed for the counting relay 113. The counting relay 113 is energized to open the circuit of the relay 313 and to prepare a circuit for the relay 112. The relay 313 is deenergized to remove the short-circuit from the winding of the relay 316 at armature 346 and to remove ground from conductor 374 at armature 347. The relay 316 operates to prepare a circuit for the relay 317 at armature 352 and to complete a circuit, at armature 353, which extends from ground by way of armature 351 and its front contact, armature 353 and its front contact and switching relay 311 to battery. The switching relay 311 is energized to associate the second group of selecting relays (not shown) with the relays in the counting chain.

By the operation of the relay 316, ground is also placed upon the conductor 275. The grounding of conductor 275 is without particular function at the present time. The removal of ground from conductor 374 opens the circuit of the relay 400 and this relay is deenergized to open the locking circuit of the relay 407. The relay 407 retracts its armature to complete a circuit for the relay 406. The relay 406 operates to open the circuit of the line relay 413 and to prepare a point in the circuit of the relay 407.

The relay 413 is deenergized to permit the operation of the relay 412. The relay 412 opens the original energizing circuit of the counting relay 113, thereby permitting the relay 112 to operate. The relay 112 operates to remove the short-circuit from the relay 125, thus permitting this relay to energize in series with all the counting relays, and at armature 143, completes a circuit extending from ground by way of said armature and its front contact, conductor 170 and relay 312 to battery.

The relay 312 operates to place ground upon conductor 373, thereby completing the circuit of the relay 401. The relay 401 operates to complete a circuit for the relay 403 and to complete a circuit for the relay 407. The relay 403 operates to open the locking circuit of the relay 402. The relay 402 is deenergized to open the circuit of the relay 414 and to establish a locking circuit for the relay 403. The relay 414 is deenergized to prepare one point in the circuit of the line relay 410.

By the operation of the relay 125, a circuit is completed at armature 161 for the slow-acting relay 124. The slow-acting relay 124 operates to open the circuits of all the counting relays 100 to 123, inclusive, at armature 158, and at armature 159 removes ground from conductor 163 and connects ground to conductor 162. The removal of ground from conductor 163 brings about the deenergization of relays 411, 412, 403 and 415. The deenergization of the relay 415 opens the circuit of the relay 405. All these relays retract their armatures to restore certain circuits to normal.

The connection of ground to conductor 162 causes the energization of the relay 207 which operates to establish a locking circuit for itself at armature 237, to open the circuits of the relays 209 and 210 at armature 238, and to open the circuit of the relay 213 at armature 236. The relay 213 is deenergized to prepare one point in the circuit of the holding relay 212. The relay 209 is deenergized to open the circuit of the relay 211. The relay 210 is deenergized to prepare a circuit for the relay 209 and to complete a holding circuit.

At the substation, the line relay 614 is operated to complete a circuit for the relay 617 and for the relay 616. The relay 616 operates to prepare a circuit for the relay 615. The relay 617 completes a circuit for the relay 608 and opens the locking circuit of the relay 618. The relay 618 is deenergized to open the circuit of the relay 609 and to establish a locking circuit for the relay 617. The relay 609 is deenergized and the relay 608 is energized to prepare a point in the circuit of the relay 600.

Another result of the operation of the relay 617 is that a circuit is completed for the counting relay 722. The counting relay 722 operates to open the circuit of the relay 516 and to prepare a circuit for the counting relay 723. The relay 516 is deenergized to open the original energizing circuit of the relay 514 at armature 550 and to remove ground from conductor 591 at armature 551. The opening of the circuit of relay 514 removes the short-circuit from the relay 513 and this relay is operated to prepare a circuit for the relay 512 at armature 544 and to complete a circuit extending from ground by way of armature 547 and its front contact, armature 545 and its front contact and switching relay 518 to battery. The relay 518 is energized to connect the second group of selecting relays (not shown) under the control of the counting relays.

The removal of ground of conductor 591 brings about the deenergization of the relay 603. The relay 603 is deenergized to open the locking circuit of the relay 601. The relay 601 retracts its armature to complete a circuit for the relay 600. The relay 600 is operated to open the circuit of the line relay 614. The relay 614 is deenergized to open the circuit of the relay 616. The relay 615 is thus energized to open the original energizing circuit of the counting relay 722. The counting relay 723 is thus permitted to operate.

Upon operating, the relay 723 removes the short-circuit from the relay 724 at armature 751, thus permitting this relay to energize in series with all the counting relays, and at armature 753 completes a circuit extending from ground by way of said armature and its front contact, conductor 575 and relay 517 to battery.

The relay 517 is operated to complete a circuit which extends from ground by way of armature 542 and its front contact, conductor 593, and relay 602 to battery. The relay 602 is operated to complete a circuit for the relay 607 and to complete a circuit for the relay 601. The relay 607 is energized to deenergize relay 606 and thereby to open the circuit of the relay 613. The relay 613 is deenergized to prepare one point in the circuit of the line relay 612. The relay 601 is energized to open the circuit of the relay 600. The relay 600 is deenergized to reestablish one point in the holding circuit.

The relay 724, upon operating, completes a circuit for the slow-acting relay 725. The relay 725 operates to open the circuits of all the counting relays 700 to 723, inclusive, also the circuit of the relay 724 at armature 756, and at armature 757 disconnects ground from conductor 770 and connects it to conductor 771. The disconnection of ground from conductor 770 opens the locking circuits of the relays 617, 607, 615 and 616. The relay 617 is deenergized to open the circuit of the relay 608 and to restore certain other circuits to normal. The relays 608, 607, 615 and 616 retract their armatures to restore certain circuits to normal.

The grounding of conductor 771 brings about the energization of the relay 816. The relay 816 operates to establish a locking circuit for itself at armature 845, to open the circuits of the relays 814 and 815 at armature 855, and to open the circuit of the relay 811 at armature 853. The relay 811 is deenergized to reestablish the holding circuit.

The holding circuit now extends from ground by way of armature 849 and its back contact, relay 813, back contact and armature 844, back contact and armature 826, conductor 674, back contact and armature 620, trunk conductor 460, armature 432 and its back contact, conductor 271, back contact and armature 230, armature 247 and its back contact, holding relay 212 and back contact and armature 243 to battery.

The holding relay 212 at the dispatcher's office, upon operating, completes a circuit for the relay 208 at armature 246. The relay 208 is operated to bring about the release of the relay 207. The relay 207 is deenergized to prepare a circuit for the relay 210.

At the substation, the holding relay 813 operates to prepare a circuit for the relay 818 at armature 847, to open the circuit of the relay 810 at armature 846 and to complete a circuit for the relay 817 at the front contact of armature 846. The relay 810 is deenergized to prepare one point in the circuit of the relay 821 at armature 843, and to prepare one point in the starting circuit at armature 842. The relay 817 is energized to open the locking circuit of the relay 816. The relay 816 is deenergized to prepare a circuit for the relay 814 at armature 855, and to complete a circuit for the relay 818 at armature 853. The relay 818 is energized to prepare certain points in the starting circuit at armatures 857 and 858.

At the dispatcher's office, another result of the energization of the holding relay 212 is that a circuit is completed which extends from ground by way of armature 356 and its front contact, armature 354 and its front contact, conductor 275, armature 290 and its front contact, back contact and armature 244, armature 242 and its back contact and relay 209 to battery. The relay 209 is energized to prepare a circuit for the relay 210 and to complete a circuit for the relay 211. The relay 211 is energized to open the original energizing circuit for the relay 209. The relay 210 is thereupon energized to open the circuit of the holding relays 212 and 813.

The relay 212 is deenergized to open the circuit of the relay 208 and to complete a circuit for the relay 213. The relay 208 is deenergized to prepare one point in the circuit of the relay 207. The relay 213 is operated to prepare one point in the circuit of the line relay 410.

At the substation, the relay 813 is deenergized to complete a circuit for the relay 810 and to open the circuit of the relay 817 at armature 846 and to complete a circuit for the relay 811 at armature 853. The relay 817 is deenergized to prepare one point in the locking circuit of the relay 816. The relay 810 is energized to open one point in the circuit of the relay 821 at armature 843 and to prepare a circuit for the relay 820 at armature 842. The relay 811 is energized to complete the control circuit.

The control circuit now extends from battery by way of armature 437 and its back contact, line relay 410, back contact and armature 448, conductor 277, front contact and armature 247, armature 230 and its back contact, conductor 271, back contact and armature 432, trunk conductor 460, armature 620 and its back contact, conductor 674, armature 826 and its back contact, armature 844 and its front contact, conductor 675, armature 647 and its back contact, line relay 612 and back contact and armature 641 to ground. The line relays 410 and 612 are now energized in series and the control circuit starts to function in the same manner as before.

By the operation of the control circuit, the counting relays and selecting relays are energized in the proper sequence. The signalling operations for controlling the operation of the apparatus units at the substation and the signalling operations for transmitting indications of the operations at the substation to the dispatcher's office take place as before.

When the counting relay 100, at the dispatcher's office, is operated by the control circuit in a manner previously described, a circuit is completed for the relay 313. The relay 313 is energized to place ground upon conductor 374 at armature 347 and to complete a circuit which extends from ground by way of front contact and armature 346, armature 352 and its front contact, armature 357 and its back contact, relay 317, armature 358 and its back contact and back contact and armature 349 to battery. The relay 317 is operated to open the circuits of the relays 315 and 316 at armature 355, to remove ground from the conductor 275 at armature 356 and to complete a circuit for the relay 318 at the front contact of armature 355.

The relay 318 is not energized so long as the original energizing circuit for the relay 317 is maintained.

The grounding of conductor 374 brings about the energization of the relay 400. The relay 400 operates to complete a circuit for the relay 402 and also for the relay 407. The relay 407 operates to open the circuit of the relay 406. The relay 406 is deenergized to complete one point in the control circuit. The relay 402 is energized to open the locking circuit of the relay 403 and to complete a circuit for the relay 414. The relay 403 is deenergized to establish a locking circuit for the relay 402. The relay 414 is operated to prepare a circuit for the line relay 413.

At the substation, when the counting relay 711 is energized by the operation of the control circuit, a circuit is completed for the relay 516. The relay 516 operates to place ground upon the conductor 591 at armature 551 and to complete a circuit extending from ground by way of front contact and armature 550, armature 544 and its front contact, armature 541 and its back contact, relay 512, back contact and armature 542 and back contact and armature 549 to battery. The relay 512 is energized over the above circuit and operates to complete a circuit for the relay 511, which is effective when the energizing circuit for the relay 512 is opened.

The grounding of conductor 591 causes the energization of the relay 603. The relay 603 operates to complete a circuit for the relay 606 and to complete a circuit for the relay 601. The relay 606 is energized to open the locking circuit of the relay 607 and to complete a circuit for the relay 613. The relay 613 is operated to prepare a circuit for the line relay 614. The relay 601 is energized to open the circuit of the relay 600. The relay 600 is deenergized to reestablish the control circuit. The line relays 413 and 614 are now energized in series.

The line relay 413 operates to cause the energization of the relays 411 and 415. As a result of the operation of the relay 415, the relays 416 and 404 are deenergized, and a circuit is completed for the counting relay 113. The operation of the counting relay 113 prepares a circuit for the counting relay 112 and opens the circuit of the relay 313. The relay 313 is deenergized to remove ground from the conductor 374 and to remove the short-circuit from the relay 318. The relay 318 is energized to remove the short-circuit from the relay 314. The relay 314 is now energized in series with the relays 315 to 318, inclusive.

The relay 314 operates to complete a circuit for the relay 319 at armature 348. The relay 319 is energized to open the circuits of the relays 314 to 318, inclusive. By the deenergization of these relays, the switching relay 311 is deenergized and the switching relay 310 is energized.

By the removal of ground from conductor 374, the relay 401 is deenergized to open the locking circuit of the relay 407. The relay 407 is deenergized to complete a circuit for the relay 406. The relay 406 is operated to open the circuit of the line relay 413. The relay 413 retracts its armature to bring about the energization of the relay 412. The relay 412 causes the operation of the counting relay 112. The counting relay 112 operates to remove the short-circuit from the relay 125 and to complete a circuit for the relay 312. The relay 312 places ground upon conductor 373, thereby completing the circuit for the relay 401.

The relay 401 operates to complete a circuit for the relay 403. The relay 403 is energized to open the locking circuit of the relay 402. The relay 402 is deenergized to open the circuit of the relay 414. The relay 414 retracts its armature to prepare a circuit for the line relay 410. The relay 407 is energized by the operation of the relay 401. The relay 407 operates to open the circuit of the relay 406. The relay 406 is deenergized to reestablish one point in the holding circuit.

The operation of the relays 124 and 125 brings about the release of certain of the apparatus in the same manner as before described. That is, all the relays 100 to 125, inclusive, are restored to normal, as are the relays 209, 210, 213, 411, 412, 415 and 405.

At the substation, the operation of the relay 614 brings about the energization of the relays 616 and 617. The relay 617 causes the deenergization of the relays 608 and 609. The relay 608 is energized to prepare a circuit for the relay 600. Another result of the operation of the relay 617 is that a circuit is completed for the counting relay 722. The counting relay 722 is energized to prepare a circuit for the counting relay 723 and to open the circuit of the relay 516. The relay 516 is deenergized to remove ground from conductor 591 and to remove the short-circuit from the winding of the relay 511. The relay 511 is energized to remove the short-circuit from the winding of the relay 515. The relay 515 at armature 542 is now energized in series with the relays 511 to 514, inclusive.

The relay 15 operates to complete a circuit for the slow-acting relay 510. The slow-acting relay 510 is energized to open the circuits of the relays 511 to 515, inclusive. These relays are deenergized, as well as the slow-acting relay 510. By these operations, the circuit of the switching relay 518 is opened and a circuit is completed for the relay 519. The switching relay 519 is energized to associate the selecting relays 500 to 509, inclusive, with the counting relays.

The removal of ground from conductor 591 opens the circuit of the relay 603. The relay 603 is deenergized to open the locking circuit of the relay 601. The relay 601 is deenergized to complete the circuit of the relay 600. The relay 600 operates to open the circuit of the line relay 614. The line relay 614 retracts its armature to permit the energization of the relay 615. The relay 615 operates to open the original energizing circuit of the relay 722, thereby bringing about the operation of the relay 723.

The relay 723 removes the short-circuit from the relay 724 and completes a circuit for the relay 517. The relay 517 is energized to complete a circuit for the relay 602. The relay 602 operates to complete a circuit for the relay 607 and also for the relay 601. The relay 607 is energized to bring about the opening of the circuit of the relay 600. The relay 606 is deenergized to complete a locking circuit for the relay 607 and to open the circuit of the relay 613. The relay 613 is deenergized to prepare a point in the circuit of the line relay 612. The relay 601 operates to open the circuit of the relay 600. The relay 600 retracts its armature to reestablish one point in the holding circuit. By the operation of the relays 724 and 725, the apparatus at the substation is restored to normal.

The relays 700 to 725, inclusive, retract their armatures, as do the relays 617, 607, 615, 616 and 608. These relays are deenergized to restore certain circuits to normal.

The relay 816 is energized by the releasing operation and the circuit of the relays 814, 815 and 811 is opened. The relays 814 and 815 are deenergized to restore certain circuits to normal, while the relay 811 is deenergized to reestablish the holding circuit whereby the holding relays 212 and 813 are energized in series.

The relay 212 operates to complete a circuit for the relay 208. The relay 208 is energized to bring about the deenergization of the relay 207. The relay 207 retracts its armatures to restore certain circuits to normal.

At the substation, the holding relay 813 is operated to open the circuit of the relay 810, to complete a circuit for the relay 817 and to prepare a circuit for the relay 818. The relay 817 is energized to open the circuit of the relay 816. The relay 816 is deenergized to complete a circuit for the relay 818. The relay 818 is operated to prepare certain starting circuits. The relay 810 retracts its armature to prepare a circuit for the starting relay 815.

In the above manner, all the apparatus is restored to normal, responsive to the operation of the circuit breaker C. It will be recalled that no signal has yet been sent to the dispatcher's office indicative of the operation of the circuit breaker C as a result of the dispatcher's control. The manner in which such a signal is sent will now be described.

It will be recalled that the common relay 809 was energized in series with the closing coil 807 of the circuit breaker C. The relay 809, upon operating, completes a circuit which extends from ground by way of armature 841 and its front contact, back contact and armature 845, armature 842 and its front contact, armature 860 and its back contact and relay 820 to battery. The relay 820 is energized to complete a circuit for the relay 810. The relay 820 also operates to prepare a circuit for the relay 821.

When the common relay 809 is deenergized, the short-circuit is removed from the relay 819 and this relay is permitted to operate. As a result of this operation, a circuit is prepared for the relay 821 at armature 861, and at armature 859 a circuit is prepared for the relay 815. The energization of relay 821 opens the series locking circuit of relays 819 and 820, thus releasing the restart circuit.

When the apparatus is finally released in the manner described, a circuit is completed which extends from ground by way of armature 859 and its front contact, back contact and armature 845, armature 842 and its back contact, armature 857 and its front contact, armature 848 and its back contact and relay 815 to battery. The relay 815 operates to complete a circuit for the relay 814 and also for the relay 812. The relay 812 operates to open the original energizing circuit for the relay 815. The relay 814 is thereupon energized to open the circuit of the holding relays 212 and 813. The apparatus thus begins to function in substantially the same manner as before described.

This starting circuit is effective only when the apparatus is completely restored to normal and is not effective during its temporary restoration after one cycle of the counting relay chains. The reason for this is that, when the holding relay 813 is energized, a circuit is not completed for the relay 818 until the relay 816 is released. Before the relay 815 has had time to operate, the apparatus starts to function by reason of the circuit of the holding relay 813 being opened by the energization of the relay 210 at the dispatcher's office.

During the second operation of the selective apparatus, the supervisory signals are changed to indicate to the dispatcher that the circuit breaker C has been operated. That is, the relay 201 is energized to bring about the release of the armatures 220 and 221, whereby the signalling device 217 is extinguished and the signalling device 216 is lighted. These operations proceed in substantially the same manner as before described.

In the event that an apparatus unit has operated at the substation under the control of automatic devices (not shown) responsive to circuit conditions, the selective apparatus starts to function by reason of the fact that the relay 809 is momentarily energized to complete a circuit from ground by way of armature 841 and its front contact, back contact and armature 845, armature 842 and its front contact, armature 857 and its front contact, armature 848, relay 815, and battery to ground for the relay 815. The relay 815 also operates to complete a circuit which extends from ground by way of armature 861 and its front contact, back contact and armature 843, front contact and armature 858, front contact and armature 850, armature 862 and its front contact and relay 821 to battery. The relay 821 operates to open the circuit of the relays 819 and 820 which retract their armatures to restore certain circuits to normal.

The relay 815 completes a circuit for the relay 814 and the relay 814 opens the circuit of the holding relays.

Should the selective apparatus be functioning when an apparatus unit is operated under automatic control, the relays 819 and 820 are operated by the momentary operation of the relay 809. When the apparatus is restored to normal, the relays 814 and 815 are then effective.

Should the dispatcher desire to trip the circuit breaker C, the operation proceeds in substantially the same manner as before with the exception that the key K is operated so that the spring 223 is forced into engagement with its working contact. By this operation, when the signalling circuit is closed, the positive pole of the battery B is connected to the signalling circuit and, as a result of this operation, the polarized relay 801 at the substation is operated in the opposite manner to cause the tripping of the circuit breaker C in an obvious manner.

My invention is not limited to the particular arrangement of the apparatus illustrated, but may be variously modified without departing from the spirit and scope thereof, as indicated in the appended claims.

I claim as my invention:

1. In a control system, comprising a dispatcher's office, a station, a plurality of apparatus units in said station and a plurality of signalling devices at said office, the combination with a single circuit connecting said office and said station, of a chain of relays at said office and a chain of relays at said station, means for operating the relays at said office in a predetermined sequence, means controlled over said circuit for operating the relays in the chain at said station in the same sequence, means controlled by said relay chains for alternately preparing a circuit to control said units and said signalling devices, a polarized relay at said office, controlled from said station, means for stopping the operation of said relay chains to select a predetermined one of said units, means including said circuit for operating the selected unit, means responsive to the operation of said unit for operating said polarized relay, and means controlled by the operation of said polarized relay for causing the continuing operation of said relay chains.

2. In a control system comprising a dispatcher's office, a station, a plurality of apparatus units at said station and signalling devices at said office, the combination with a relay chain at said office and a relay chain at said station, of a trunk comprising a single pair of conductors connecting said office and said station, means for operating the relays in the chain at said office in a predetermined sequence, a source of direct current for operating the relays at the station, means responsive to the operation of the relays at the office for causing the transmission of direct current impulses from said source over said pair of conductors for operating the relay chain at the station in the same sequence, means controlled by said relay chains for selecting a predetermined apparatus unit, means for causing the transmission of direct current over said pair of conductors and responsive to the selection of an apparatus unit for operating said signalling device corresponding to the selected unit to indicate the condition of said unit, means for causing the transmission of direct current over said pair of conductors for operating a selected unit, and means responsive to such operation for causing another operation of all of the relays in said chains.

3. In a control system comprising a dispatcher's office, a station, a plurality of apparatus units in said station and a plurality of signalling devices at said office, the combination with a single circuit connecting said office and said station, of a chain of relays at said office and a chain of relays at said station, means for operating the relays at said office in a predetermined sequence, means controlled over said circuit for operating the relays at said station in the same sequence, a unit control circuit at said station and a signal control circuit at said office, means controlled by said relay chains for alternately preparing said unit control and signal control circuits to control said units and said signalling devices over said single circuit, means operative when a unit or signalling device is controlled for momentarily stopping the operation of the chains until the operation is completed, and means operative when no apparatus units and signalling devices are being controlled for continuing the operation of said relay chains.

4. In a supervisory control system, a first station, a second station, apparatus units at said second station, signalling devices individual thereto at said first station, a signalling line connecting said stations, selectors at each of said stations, means controlled by said selectors for transmitting impulses of a predetermined frequency over said signalling line, means responsive to said impulses for operating said selectors in synchronism, means operative when said selectors are in synchronism for associating one of said apparatus units with said signalling line, means including impulses of the same predetermined frequency transmitted over said signalling line for operating said associated apparatus unit, means controlled by the operation of the unit for transmitting impulses of the same predetermined frequency over said signalling line, and means responsive to said impulses for operating said signalling device individual to said apparatus unit.

5. In a supervisory control system, a first station, a second station, apparatus units at said second station, signalling devices individual thereto at said first station, a signalling line connecting said stations, chains of relays at each of said stations, said chains of relays being normally in a non-operating condition, means for starting said chains of relays into operation manually from said first station or automatically in response to an operation of an apparatus unit at said second station, a source of direct current at each of said stations, means for transmitting direct current from one of said sources over said signalling line, means responsive to said transmitted direct current for operating said chains of relays to select an apparatus unit, means for transmitting currents from one of said sources over the said signalling line for operating said selected apparatus unit, and means for transmitting currents from the other of said direct current sources over said signalling line for operating the signalling device individual to said operated apparatus unit.

6. In a supervisory control system, a first station, a second station, apparatus units at said second station, signalling devices individual thereto at said first station, a signalling line connecting said stations, selecting apparatus at said stations, said selecting apparatus being normally at rest, means including said signalling line responsive to an automatic operation of one of said units at said second station for starting said selecting apparatus into operation, a source of direct current, means for transmitting direct current from said source over said signalling line from the first station, means responsive to said direct current for driving said selecting apparatus in synchronism, and means including said selecting apparatus for transmitting direct current from said second station over said signalling line responsive to the operation of said apparatus unit for operating one of said signalling devices individual to said unit.

In testimony whereof, I have hereunto subscribed my name this 18th day of June, 1924.

THOMAS U. WHITE.